(12) United States Patent
Wang et al.

(10) Patent No.: US 10,141,809 B2
(45) Date of Patent: Nov. 27, 2018

(54) MOTOR CONTROLLER AND MOTOR COMPRISING THE SAME

(71) Applicant: Zhongshan Broad-Ocean Motor Co., Ltd., Zhongshan (CN)

(72) Inventors: Xiongcheng Wang, Zhongshan (CN); Wenqing Bian, Zhongshan (CN); Yueqiang Yu, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 394 days.

(21) Appl. No.: 15/009,812

(22) Filed: Jan. 28, 2016

(65) Prior Publication Data

US 2016/0149473 A1 May 26, 2016

Related U.S. Application Data

(63) Continuation-in-part of application No. PCT/CN2014/087345, filed on Sep. 24, 2014, and a
(Continued)

(30) Foreign Application Priority Data

May 29, 2014 (CN) ...................... 2014 2 0283808 U
Jul. 30, 2014 (CN) ...................... 2014 2 0426914 U (51) Int. Cl.
*H02K 5/15* (2006.01)
*H02K 5/18* (2006.01)
(Continued)

(52) U.S. Cl.
CPC .............. *H02K 5/15* (2013.01); *H02K 5/18* (2013.01); *H02K 5/20* (2013.01); *H02K 5/225* (2013.01); *H02K 11/215* (2016.01); *H02K 11/33* (2016.01)

(58) Field of Classification Search
CPC .. H02K 5/15; H02K 5/18; H02K 5/20; H02K 5/225; H02K 11/215; H02K 11/33
(Continued)

(56) References Cited

U.S. PATENT DOCUMENTS

| 4,847,527 A | 7/1989 | Dohogne |
| 9,105,596 B2 * | 8/2015 | Bian ....................... H01L 23/36 |

(Continued)

FOREIGN PATENT DOCUMENTS

| CN | 101795043 A | 8/2010 |
| CN | 201860223 U | 6/2011 |

(Continued)

*Primary Examiner* — Forrest M Phillips
(74) *Attorney, Agent, or Firm* — Matthias Scholl, PC; Matthias Scholl (57) ABSTRACT

A motor controller including a control box and a control circuit board disposed on the chamber of the control box. A control chip is disposed on the outer edge of the upper surface of the control circuit board. The outer wall of the control box is depressed inward to form a heat dissipation boss. A gap is formed between the bottom of the heat dissipation boss and the inner surface of the bottom of the chamber. The inner surface of the bottom of the chamber is provided with a plurality of supporting bosses. One outer edge of the control circuit board inserts into the gap, which enables the outer side surface of the control chip to cling to the inner side surface of the heat dissipation boss. The control circuit board is supported by upper surfaces of the supporting bosses.

20 Claims, 13 Drawing Sheets

Related U.S. Application Data continuation-in-part of application No. PCT/CN2015/077454, filed on Apr. 24, 2015.

(51) Int. Cl.
*H02K 5/20* (2006.01)
*H02K 5/22* (2006.01)
*H02K 11/33* (2016.01)
*H02K 11/215* (2016.01)

(58) Field of Classification Search
USPC .......................................................... 310/64
See application file for complete search history.

(56) References Cited

U.S. PATENT DOCUMENTS

| | | | | |
|---|---|---|---|---|
| 9,420,723 B2* | 8/2016 | Wu | ......................... | H02K 11/33 |
| 9,769,962 B2* | 9/2017 | Huang | ................ | H05K 7/20927 |
| 9,788,458 B2* | 10/2017 | Tang | .................. | H05K 7/20418 |
| 2011/0068661 A1* | 3/2011 | Clendenen | ............. | H02K 11/33 |
| | | | | 310/68 D |
| 2015/0270757 A1* | 9/2015 | Jang | ........................ | H02K 1/185 |
| | | | | 310/71 |
| 2015/0318752 A1* | 11/2015 | Collins | ................... | H02K 1/185 |
| | | | | 310/64 |
| 2016/0134178 A1* | 5/2016 | Acinas Lope | ........ | B62D 5/0406 |
| | | | | 310/64 |
| 2016/0204669 A1* | 7/2016 | Tanaka | ..................... | H02K 5/18 |
| | | | | 310/64 |

FOREIGN PATENT DOCUMENTS

| | | |
|---|---|---|
| CN | 202353990 U | 7/2012 |
| CN | 202734851 U | 2/2013 |
| CN | 203027108 U | 6/2013 |
| CN | 203554140 U | 4/2014 |
| CN | 203554204 U | 4/2014 |
| CN | 204030868 U | 12/2014 |
| JP | 11215774 A | 8/1999 |
| KR | 20080029132 A | 4/2008 |

* cited by examiner

MOTOR CONTROLLER AND MOTOR COMPRISING THE SAME

CROSS-REFERENCE TO RELATED APPLICATIONS

This application is a continuation-in-part of International Patent Application No. PCT/CN2014/087345 with an international filing date of Sep. 24, 2014, and of International Patent Application No. PCT/CN2015/077454 with an international filing date of Apr. 24, 2015, designating the United States, now pending, and further claims priority benefits to Chinese Patent Application No. 201420283808.0 filed May 29, 2014, and to Chinese Patent Application No. 201420426914.X filed Jul. 30, 2014. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to a motor controller and a motor comprising the same.

Description of the Related Art

Conventional control circuit boards have various sizes and limited adjusting space, and the control chip of the control circuit boards cannot be absolutely clung to the heat dissipation boss. As a result, the heat dissipation of the control chip is adversely affected and the work efficiency of the control chip is reduced. Worse yet, problems with heat dissipation often lead to a burnout of the control circuit board.

SUMMARY OF THE INVENTION

In view of the above-described problems, it is one objective of the invention to provide a motor controller which features simple structure, and convenient installation. The outer side surface of the control chip of the motor controller is clung to the inner side surface of the heat dissipation boss, so that the motor controller has good heat dissipation performance.

It is another objective of the invention to provide a motor which features simple structure, convenient installation, good heat dissipation performance, and high reliability.

To achieve the above objective, in accordance with one embodiment of the invention, there is provided a motor controller, comprising a control box and a control circuit board disposed on a chamber of the control box. A control chip is disposed on an outer edge of an upper surface of the control circuit board. An outer wall of the control box is depressed inward to form a heat dissipation boss. A gap is formed between a bottom of the heat dissipation boss and an inner surface of a bottom of the chamber. The inner surface of the bottom of the chamber is provided with a plurality of supporting bosses. One outer edge of the control circuit board inserts into the gap and enables an outer side surface of the control chip to cling to an inner side surface of the heat dissipation boss. The control circuit board is supported by upper surfaces of the supporting bosses.

In a class of this embodiment, the control chip is sheathed with a silicone case. The control circuit board is provided with a plurality of mounting feet. The mounting feet are supported by the upper surfaces of the supporting bosses.

In a class of this embodiment, one side of the control chip is provided with a compressing bar to tightly compress the control chip on the inner side surface of the heat dissipation boss. A first screw passes through an outer side surface of the heat dissipation boss and is screwed up in the compressing bar so as to mount the compressing bar on the heat dissipation boss.

In a class of this embodiment, the outer side surface of the heat dissipation boss is provided with a plurality of fins. The mounting feet are installed on the upper surfaces of the supporting bosses via a second screw.

In a class of this embodiment, the control box is provided with a mounting hole. The control circuit board is provided with a socket. The socket is sheathed in a wire sheath. The wire sheath is disposed in the mounting hole.

In a class of this embodiment, the wire sheath is square-shaped. Two sides and a bottom of the wire sheath are provided with slots so that an inner wall of the mounting hole is sheathed in the slots. The chamber is filled with potting material which covers part of or all of the control circuit board.

A motor comprises a motor body and a motor controller. The motor body comprises a rotary shaft, a rotor assembly, a stator assembly and a shell assembly. The rotor assembly is disposed on the rotary shaft. The stator assembly is integrated with the shell assembly, and is sleeved on the outer side of the rotor assembly. The motor controller is disposed on the shell assembly. The motor controller is the same as the motor controller described above.

In a class of this embodiment, the motor further comprises a box body, a circuit board, and a Hall element. The stator assembly comprises a stator core, a terminal insulator, and coil windings. The terminal insulator is disposed on one end of the stator core. The coil windings are coiled on the terminal insulator. The box body is disposed on the terminal insulator. The box body is provided with a chamber comprising a bottom wall. The bottom wall of the chamber is provided with a supporting boss, and the circuit board is supported by an upper surface of the supporting boss. The bottom wall of the chamber is depressed to form a mounting slot. The Hall element of the circuit board is inserted into the mounting slot. Sealing glue is injected into the chamber to seal the Hall element in the mounting slot and coat the circuit board.

In a class of this embodiment, an outer wall of the box body is provided with three mounting feet. The terminal insulator comprises a circular yoke, and a plurality of tooth portions stretching out of the circular yoke. Winding slots are formed between every two tooth portions. At an inner side of one winding slot, a left support column and a right support column are disposed on an upper surface of adjacent tooth portions. At an outer side of the winding slot, a first support column is disposed on an upper surface of the circular yoke. The box body is disposed on upper surfaces of the first support column, the left support column, and the right support column via the three mounting feet.

In a class of this embodiment, the bottom wall of the chamber is depressed to form the mounting slot, and a lug boss is formed on a bottom of the box body. A left base is disposed on a bottom of the left support column, and the upper surface of the tooth portion. A right base is disposed on a bottom of the right support column, and the upper surface of the tooth portion. A slot is formed between the left base and the right base. The lug boss is sheathed in the slot and is supported by the upper surface of the tooth portion.

The Hall element is sheathed in the mounting slot and leans outside of the rotor assembly.

Compared with existing technologies, advantages of the motor controller and the motor comprising the same are summarized as follows:

1) The motor controller features simple structure, and convenient installation. The outer side surface of the control chip is clung to the inner side surface of the heat dissipation boss so that the motor controller has good heat dissipation performance.

2) The control chip is sleeved with a silicone case, thus improving the heat dissipation performance of the control chip, and endowing the control chip with insulation property and high reliability.

3) The first screw passes through the outer side surface of the heat dissipation boss and is screwed up in the compressing bar to mount the compressing bar on the heat dissipation boss, and the installation is reliable.

4) The outer side surface of the heat dissipation boss is provided with a plurality of fins, thus improving the heat dissipation performance; the mounting feet are installed on the upper surfaces of the supporting bosses via second screws, and the installation is reliable.

5) Potting material covers part of or all of the control circuit board, preventing dust or water from electronic components of the control circuit board.

6) The sealing glue seals the Hall element in the mounting slot and coats the circuit board. The circuit board and the Hall element of the sealing structure have good sealing and waterproof properties, thus avoiding damage from contaminants, and guaranteeing the reliable operation thereof.

7) The box body is disposed on upper surfaces of the first support column, the left support column, and the right support column via the three mounting feet. The arrangement is simple and the installation is convenient and reliable.

8) The lug boss is sheathed in the slot and is supported by the upper surface of the tooth portion. The Hall element is sheathed in the mounting slot and leans against the outer end of the rotor assembly. The arrangement is simple, and the installation is convenient and reliable, thereby guaranteeing the reliability of the Hall element.

DETAILED DESCRIPTION OF THE EMBODIMENTS

For further illustrating the invention, experiments detailing a motor controller and a motor comprising the same are described below. It should be noted that the following examples are intended to describe and not to limit the invention.

Example 1

Figure 1:
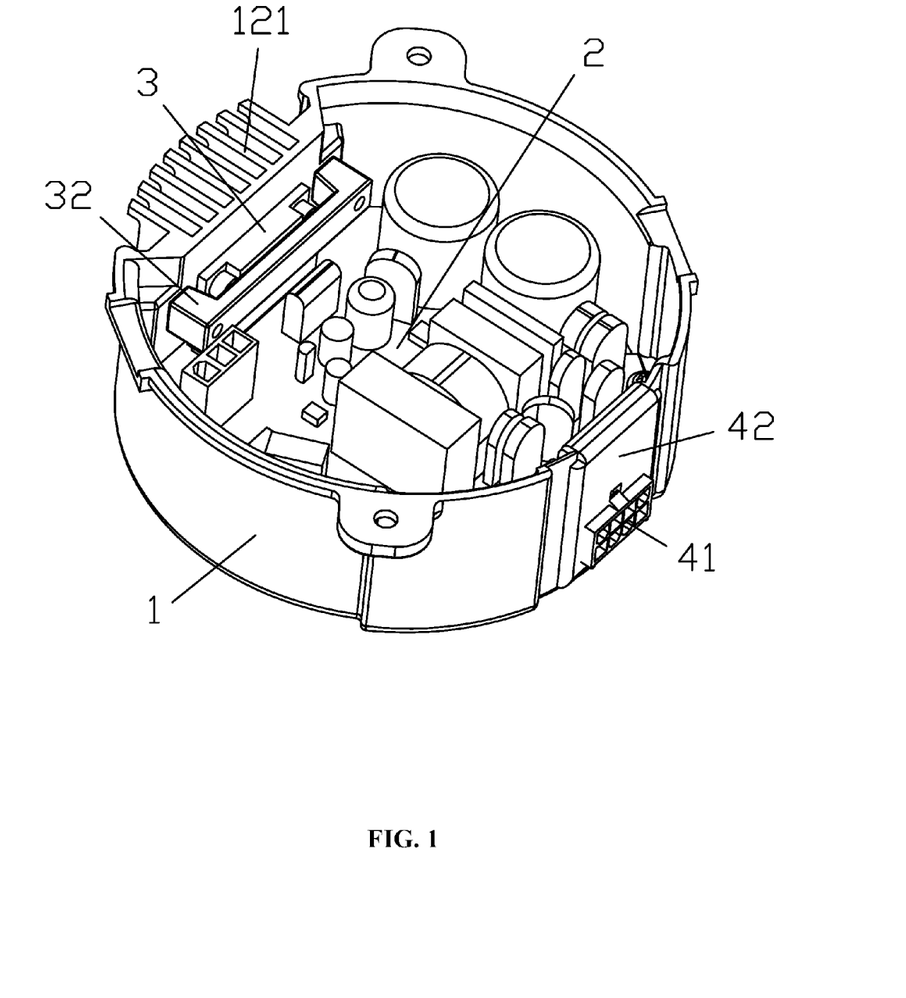
FIG. 1 is a stereogram of a motor controller in accordance with one embodiment of the invention.
Figure 2:
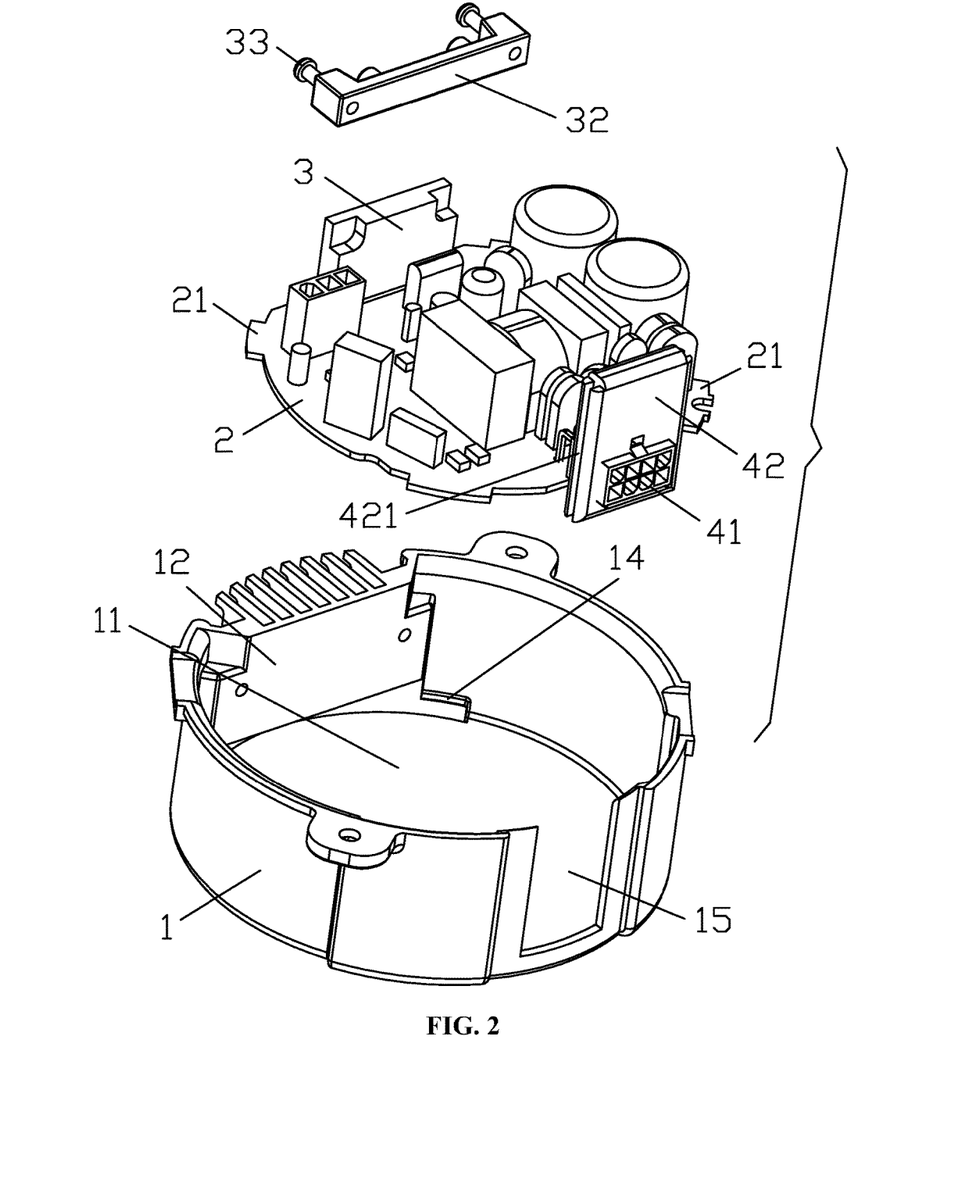
FIG. 2 is an exploded view of a motor controller in accordance with one embodiment of the invention.
Figure 3:
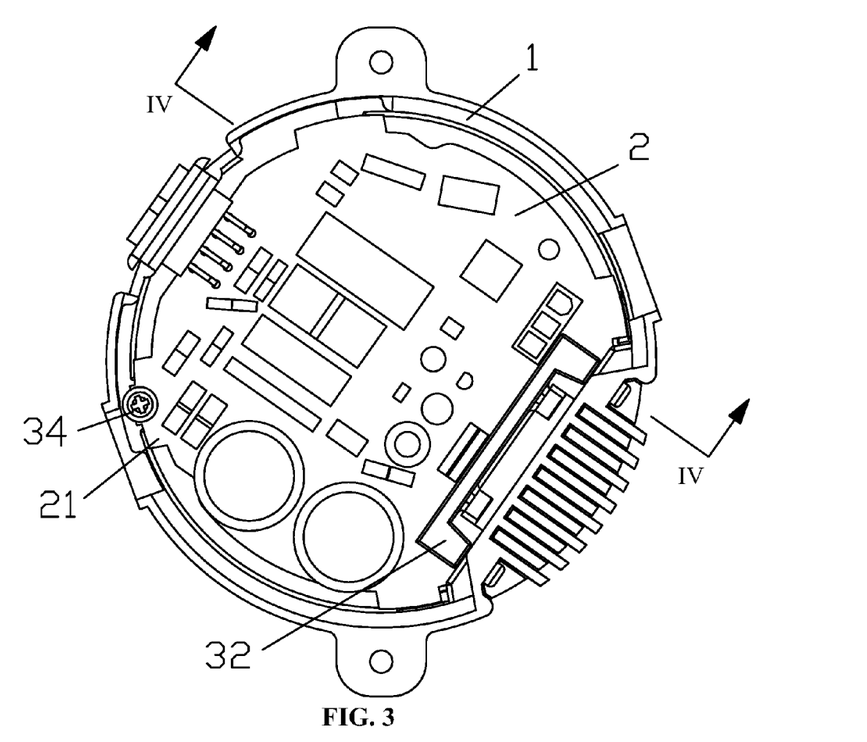
FIG. 3 is a top view of a motor controller in accordance with one embodiment of the invention.
Figure 4:
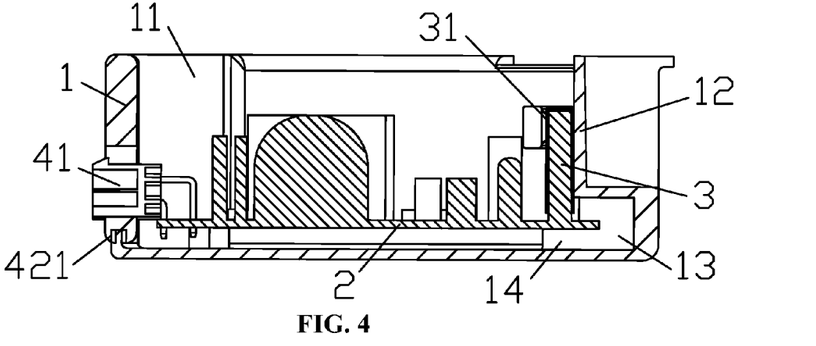
FIG. 4 is a cross-sectional view taken from line IV-IV in FIG. 3 in accordance with one embodiment of the invention.
Figure 5:
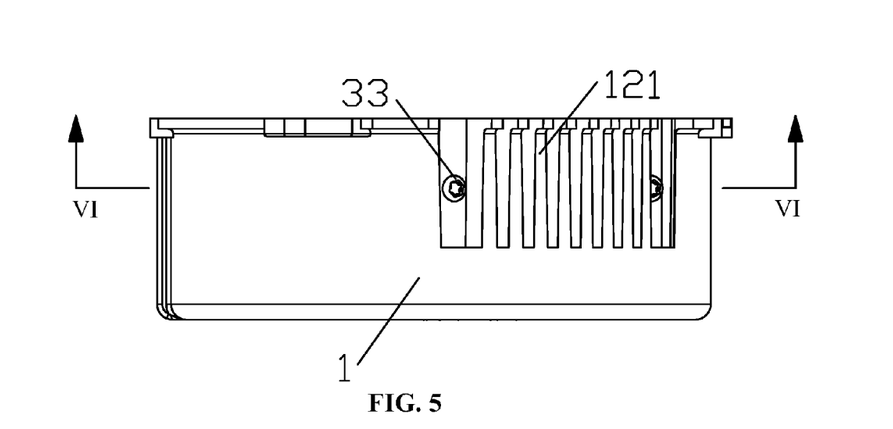
FIG. 5 is a front view of a motor controller in accordance with one embodiment of the invention.
Figure 6:
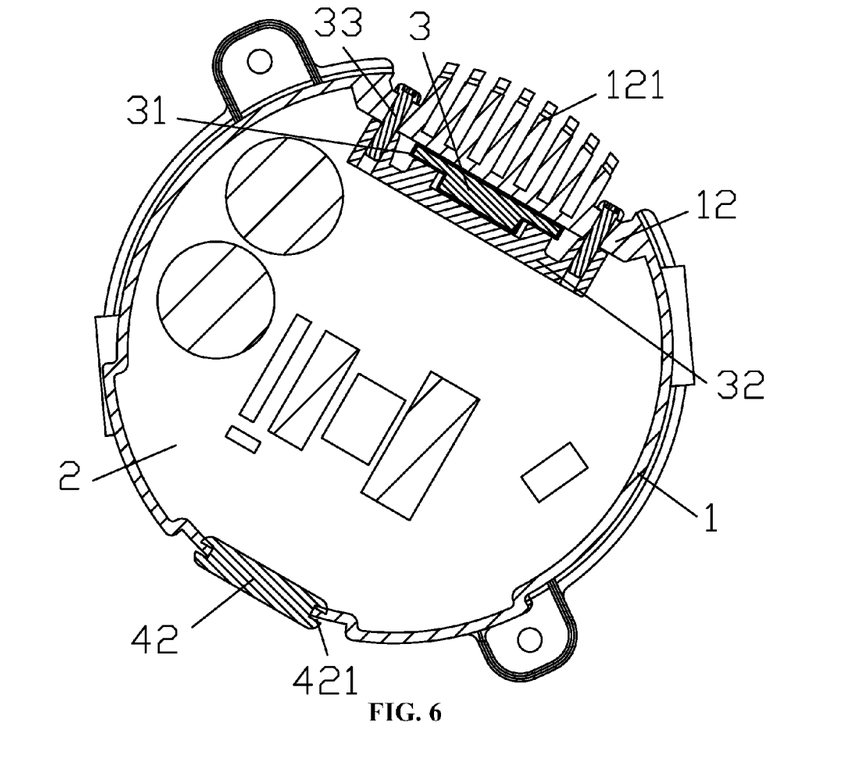
FIG. 6 is a cross-sectional view taken from line VI-VI in FIG. 5 in accordance with one embodiment of the invention.

As shown in FIGS. 1-6, a motor controller comprises a control box 1 and a control circuit board 2 disposed on a chamber 11 of the control box 1. A control chip 3 is disposed on an outer edge of an upper surface of the control circuit board 2. An outer wall of the control box 1 is depressed inward to form a heat dissipation boss 12. A gap 13 is formed between a bottom of the heat dissipation boss 12 and an inner surface of a bottom of the chamber 11. The inner surface of the bottom of the chamber 11 is provided with a plurality of supporting bosses 14. One outer edge of the control circuit board 2 inserts into the gap 13 and enables an outer side surface of the control chip 3 to cling to an inner side surface of the heat dissipation boss 12. The control circuit board 2 is supported by upper surfaces of the supporting bosses 14. The control chip 3 is sheathed with a silicone case 31. The control circuit board 2 is provided with a plurality of mounting feet 21. The mounting feet 21 are supported by the upper surfaces of the supporting bosses 14. One side of the control chip 3 is provided with a compressing bar 32 to tightly compress the control chip 3 on the inner side surface of the heat dissipation boss 12. A first screw 33 passes through an outer side surface of the heat dissipation boss 12 and is screwed up in the compressing bar 32 so as to mount the compressing bar 32 on the heat dissipation boss 12. The outer side surface of the heat dissipation boss 12 is provided with a plurality of fins 121. The mounting feet 21 are installed on the upper surfaces of the supporting bosses 14 via a second screw 34. The control box 1 is provided with a mounting hole 15. The control circuit board 2 is provided with a socket 41. The socket 41 is sheathed in a wire sheath 42. The wire sheath 42 is disposed in the mounting hole 15. The wire sheath 42 is square-shaped. Two sides and a bottom of the wire sheath 42 are provided with slots 421 so that an inner wall of the mounting hole 15 is sheathed in the slots 421. The chamber 11 is filled with potting material which covers part of or all of the control circuit board 2.

Example 2

Figure 7:
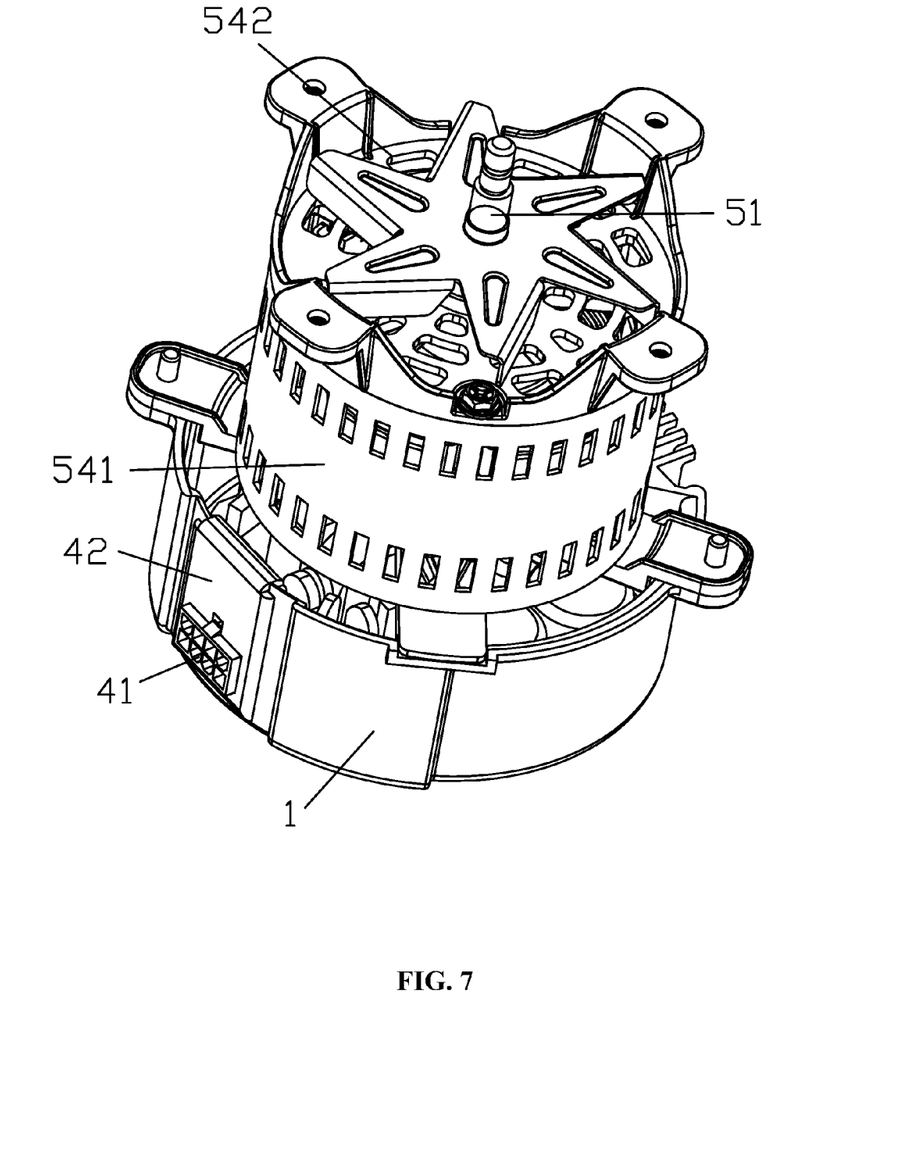
FIG. 7 is a stereogram of a motor in accordance with one embodiment of the invention.
Figure 8:
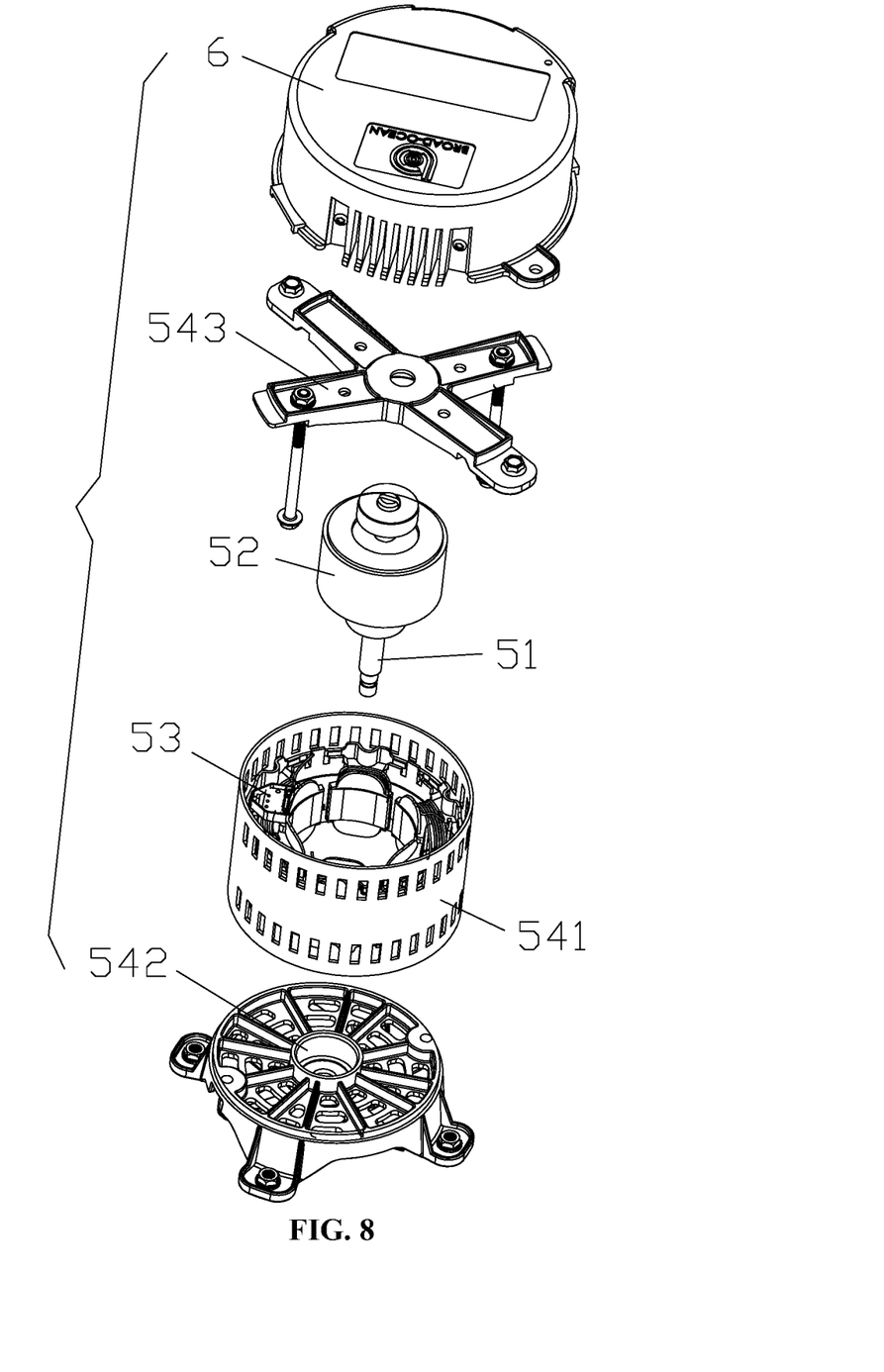
FIG. 8 is an exploded view of a motor in accordance with one embodiment of the invention.
Figure 9:
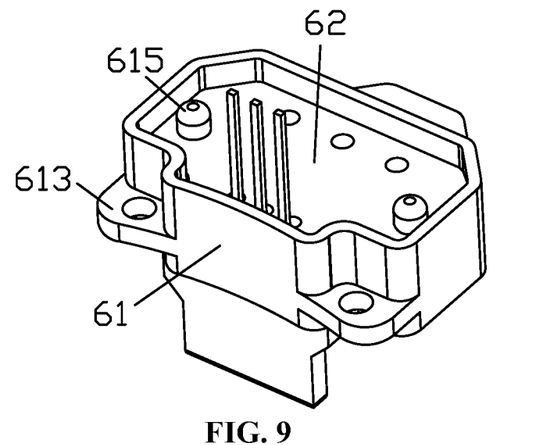
FIG. 9 is stereogram showing an installation of a box body, a circuit board, and a Hall element in accordance with one embodiment of the invention.
Figure 10:
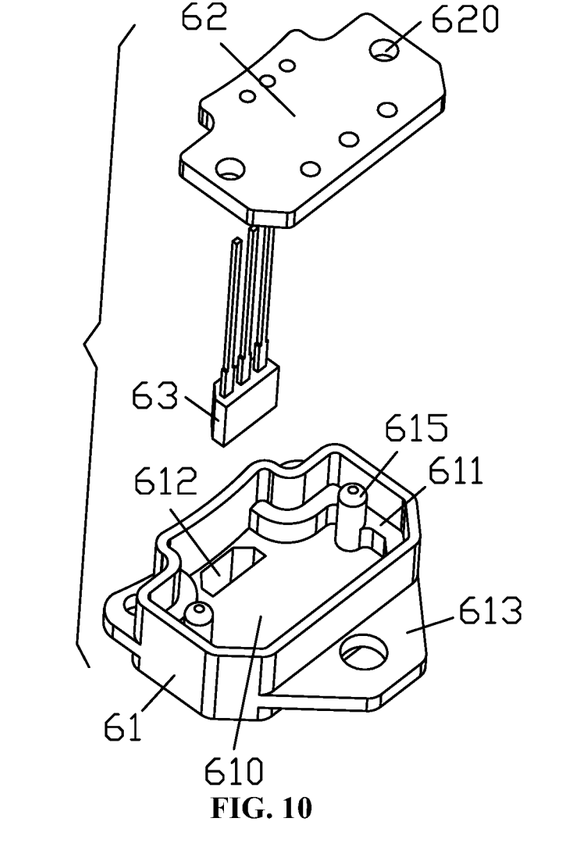
FIG. 10 is an exploded view showing an installation of a box body, a circuit board, and a Hall element in accordance with one embodiment of the invention.
Figure 11:
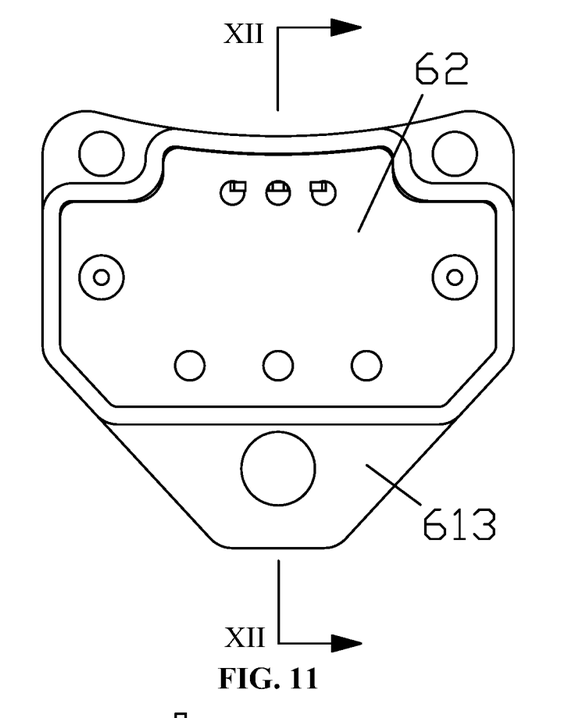
FIG. 11 is a top view showing an installation of a box body, a circuit board, and a Hall element in accordance with one embodiment of the invention.
Figure 12:
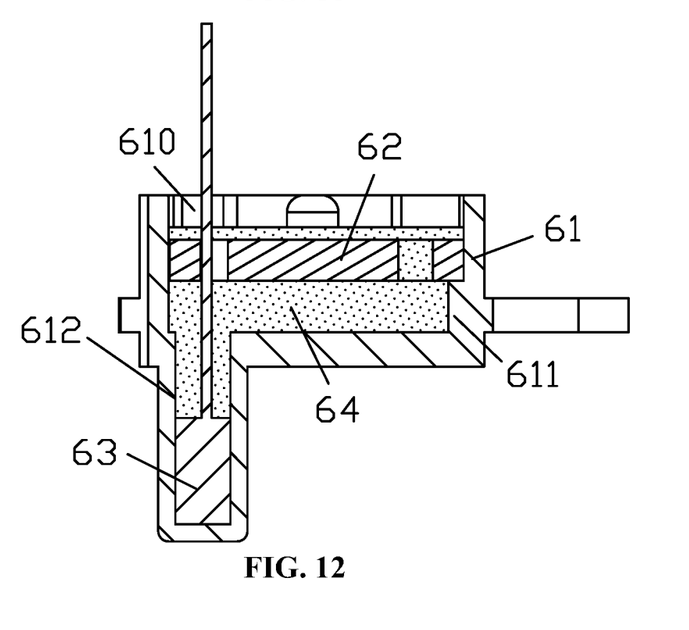
FIG. 12 is a cross-sectional view taken from line XII-XII in FIG. 11 in accordance with one embodiment of the invention.
Figure 13:
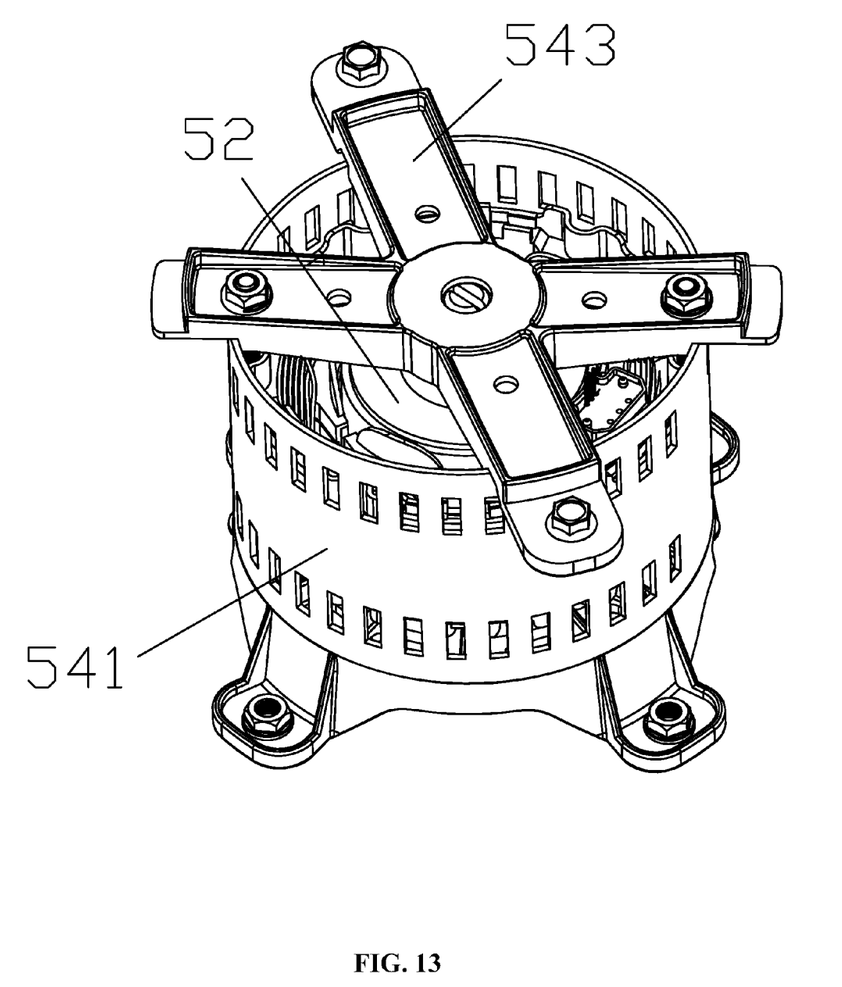
FIG. 13 is a stereogram of a motor body in accordance with one embodiment of the invention.
Figure 14:
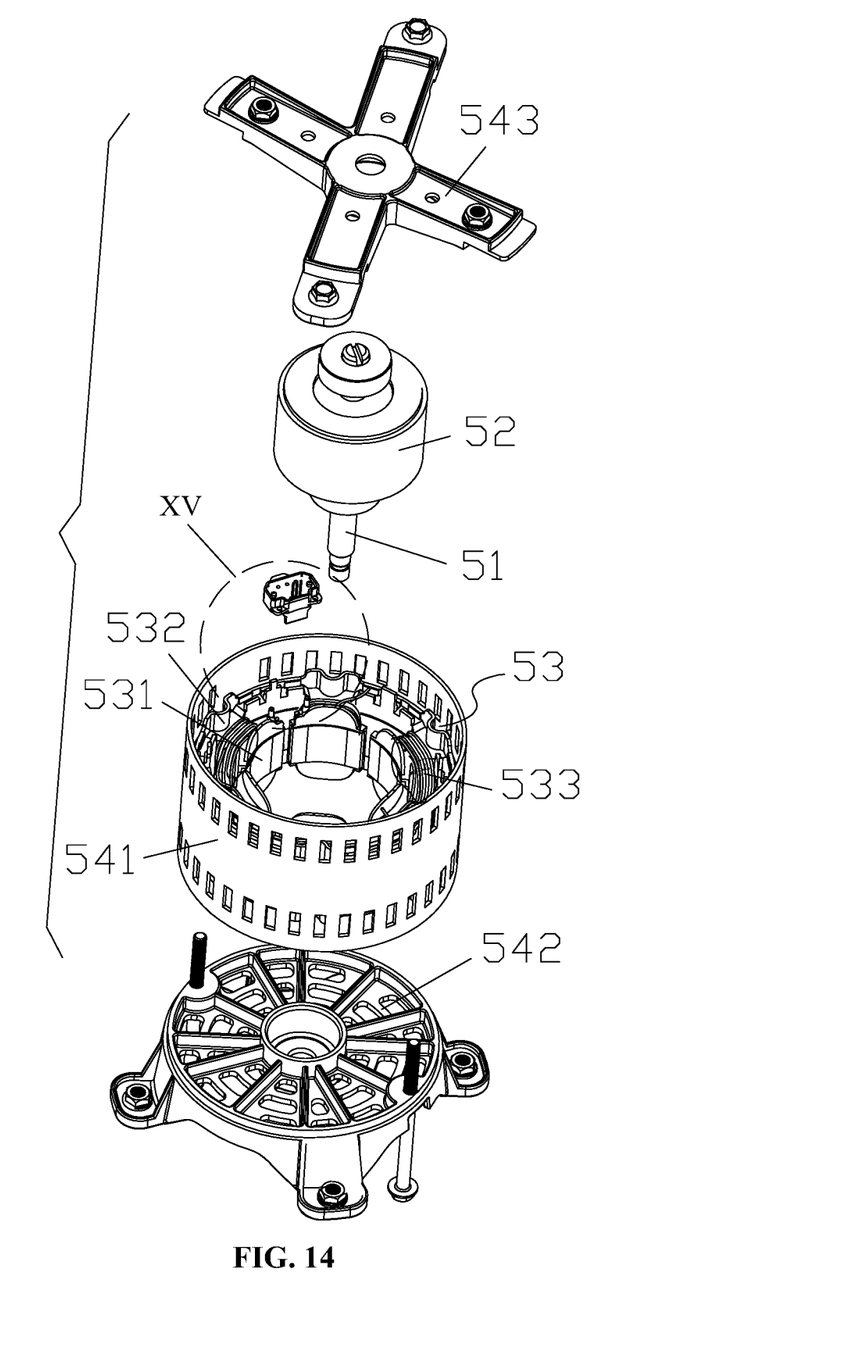
FIG. 14 is an exploded view of a motor body in accordance with one embodiment of the invention.
Figure 15:
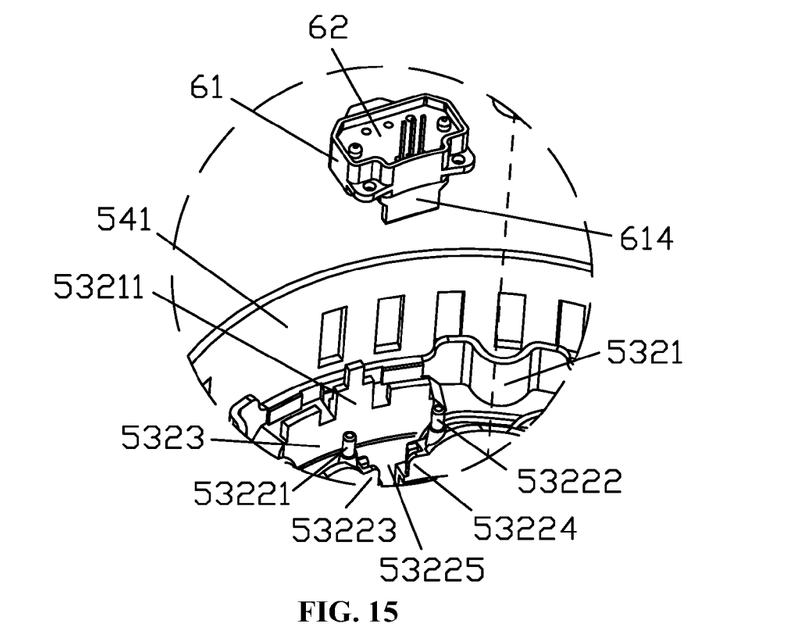
FIG. 15 is an enlarged view taken from XV part in FIG. 14 in accordance with one embodiment of the invention.
Figure 16:
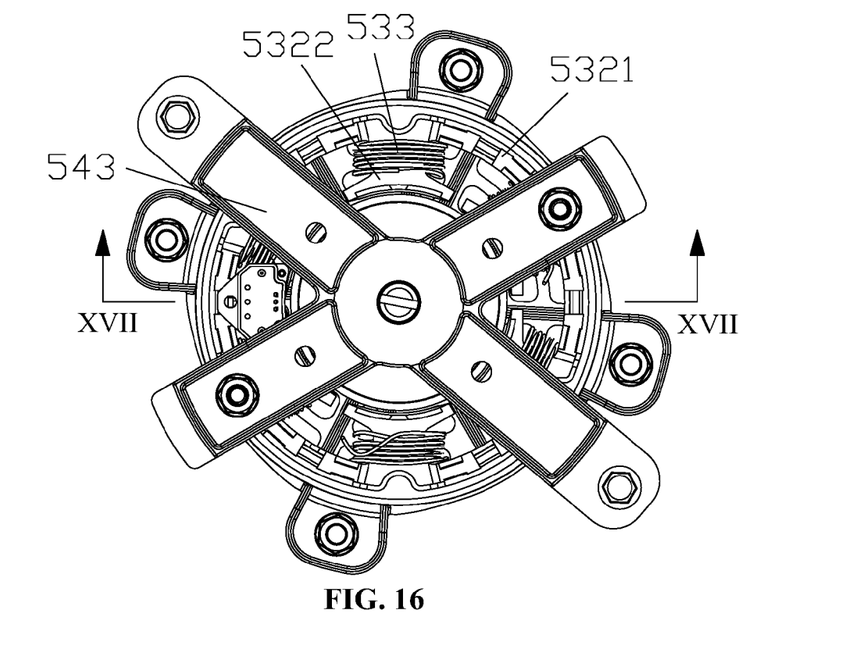
FIG. 16 is a top view of a motor body in accordance with one embodiment of the invention.
Figure 17:
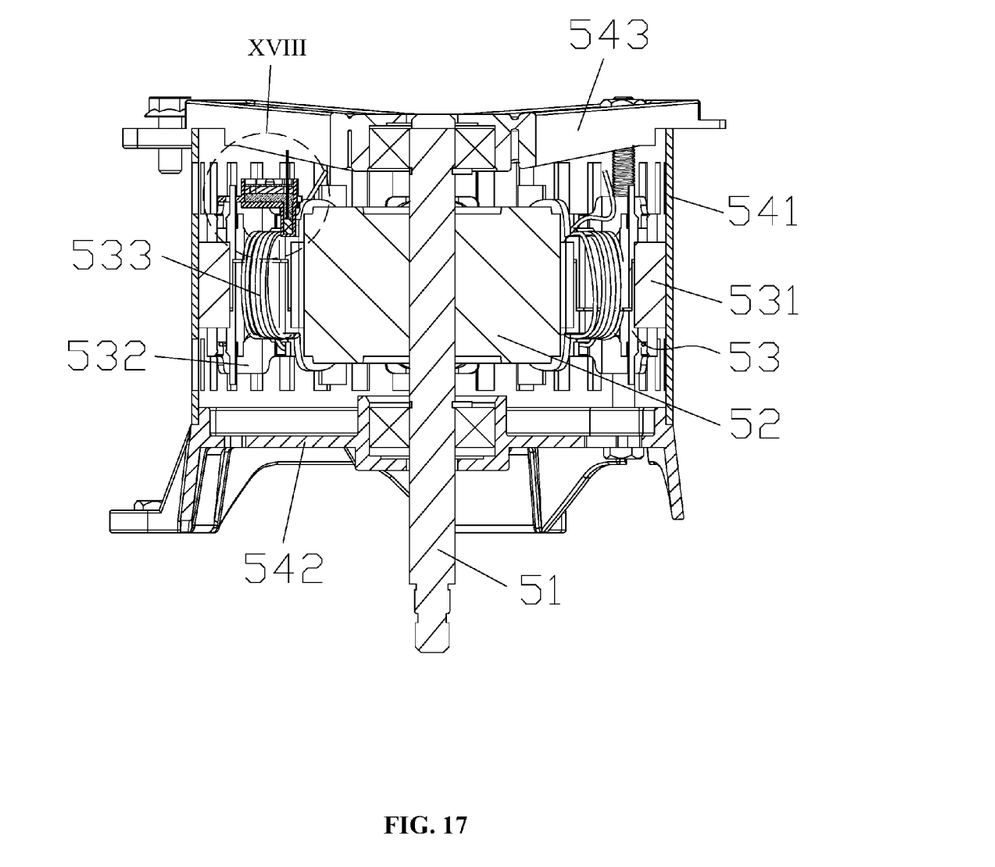
FIG. 17 is a cross-sectional view taken from line XVII-XVII in FIG. 16 in accordance with one embodiment of the invention.
Figure 18:
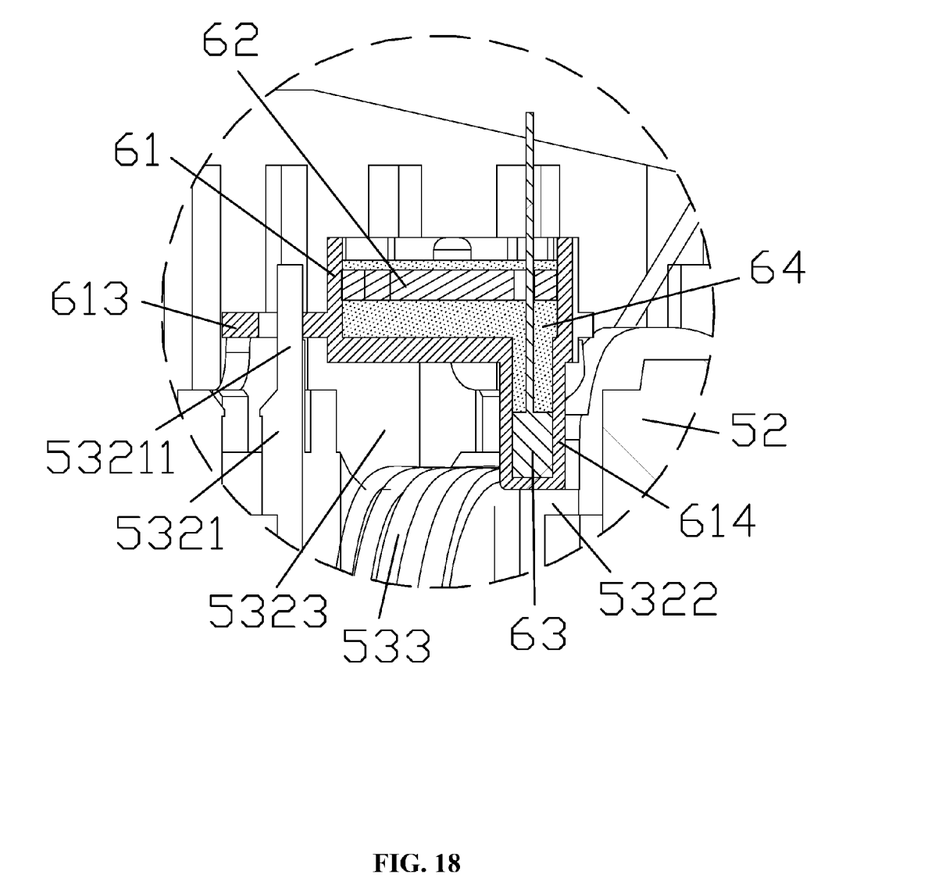
FIG. 18 is an enlarged view taken from F part in FIG. 17 in accordance with one embodiment of the invention.

As shown in FIGS. 7-18, a motor comprises a motor body and a motor controller 6. The motor body comprises a rotary shaft 51, a rotor assembly 52, a stator assembly 53 and a shell assembly. The shell assembly comprises a shell 541, a front cover 542, and a rear cover 543. The rotor assembly 52 is disposed on the rotary shaft 51. The stator assembly 53 is integrated with the shell 541, and is sleeved on the outer side of the rotor assembly 52. The motor controller is disposed on the rear cover 543. The motor controller 6 is the same as the motor controller described in example 1.

The motor further comprises a box body 61, a circuit board 62, and a Hall element 63. The stator assembly 53 comprises a stator core 531, a terminal insulator 532, and coil windings 533. The terminal insulator 532 is disposed on one end of the stator core 531. The coil windings 533 are coiled on the terminal insulator 532. The box body 61 is disposed on the terminal insulator 532. The box body 61 is provided with a chamber 610 comprising a bottom wall. The bottom wall of the chamber 610 is provided with a supporting boss 611, and the circuit board 62 is supported by an upper surface of the supporting boss 611. The bottom wall of the chamber 610 is depressed to form a mounting slot 612. The Hall element 63 of the circuit board 62 is inserted into the mounting slot 612. Sealing glue 64 is injected into the chamber 610 to seal the Hall element 63 in the mounting slot 612 and coat the circuit board 62. An outer wall of the box body 61 is provided with three mounting feet 613. The terminal insulator 532 comprises a circular yoke 5321, and a plurality of tooth portions 5322 stretching out of the circular yoke 5321. Winding slots 5323 are formed between every two tooth portions 5322. At an inner side of one winding slot 5323, a left support column 53221 and a right support column 53222 are disposed on an upper surface of adjacent tooth portions 5322. At an outer side of the winding slot 5323, a first support column 53211 is disposed on an upper surface of the circular yoke 5321. The box body 61 is disposed on upper surfaces of the first support column 53211, the left support column 53221, and the right support column 53222 via the three mounting feet 613. The bottom wall of the chamber 610 is depressed to form the mounting slot 612, and a lug boss 614 is formed on a bottom of the box body 61. A left base 53223 is disposed on a bottom of the left support column 53221, and the upper surface of the tooth portion 5322. A right base 53224 is disposed on a bottom of the right support column 53222, and the upper surface of the tooth portion 5322. A slot 53225 is formed between the left base 53223 and the right base 53224. The lug boss 614 is sheathed in the slot 53225 and is supported by the upper surface of the tooth portion 5322. The Hall element 63 is sheathed in the mounting slot 612 and leans outside of the rotor assembly 52.

Preferably, the chamber 610 is provided with a plurality of columns 615. The columns 615 are sheathed in through holes 620 of the circuit board 62.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A motor controller, comprising:
   a) a control box, the control box comprising a bottom plate, a first chamber and a side wall;
   b) a control circuit board, the control circuit board comprising a planar plate;
   c) a control chip; and
   d) a heat dissipation boss; the heat dissipation boss comprising a first side surface;

wherein
   the side wall extends from and is substantially perpendicular to the bottom plate;
   the first chamber is limited by the bottom plate and the side wall;
   the control circuit board is disposed within the first chamber;
   the control chip is disposed on the planar plate of the control circuit board;
   the side wall is depressed toward the first chamber to form the heat dissipation boss;
   the first side surface of the heat dissipation boss is adjacent to the first chamber and is substantially perpendicular to the bottom plate;
   a gap is formed between the heat dissipation boss and the bottom plate;
   the bottom plate is provided with a first plurality of supporting bosses;
   the planar plate of the control circuit board is inserted into the gap;
   the control chip clings to the first side surface of the heat dissipation boss;
   the planar plate of the control circuit board is substantially parallel to the bottom plate; and
   the planar plate of the control circuit board is supported by of the first plurality of supporting bosses.

2. The motor controller of claim 1, wherein the control chip is sheathed with a silicone case; the control circuit board is provided with a plurality of mounting feet; and the mounting feet are supported by the first plurality of supporting bosses.

3. The motor controller of claim 2, wherein the heat dissipation boss further comprises a second side surface; the second side surface is opposite to the first side surface; one side of the control chip is provided with a compressing bar to tightly compress the control chip on the first side surface of the heat dissipation boss; and a first screw passes through the second side surface of the heat dissipation boss and is screwed up in the compressing bar to mount the compressing bar on the heat dissipation boss.

4. The motor controller of claim 3, wherein the second side surface of the heat dissipation boss is provided with a plurality of fins; and the mounting feet are installed on the first plurality of supporting bosses via a second screw.

5. The motor controller of claim 1, wherein the control box is provided with a mounting hole; the control circuit board is provided with a socket; the socket is sheathed in a wire sheath; and the wire sheath is disposed in the mounting hole.

6. The motor controller of claim 2, wherein the control box is provided with a mounting hole; the control circuit board is provided with a socket; the socket is sheathed in a wire sheath; and the wire sheath is disposed in the mounting hole.

7. The motor controller of claim 3, wherein the control box is provided with a mounting hole; the control circuit board is provided with a socket; the socket is sheathed in a wire sheath; and the wire sheath is disposed in the mounting hole.

8. The motor controller of claim 4, wherein the control box is provided with a mounting hole; the control circuit board is provided with a socket; the socket is sheathed in a wire sheath; and the wire sheath is disposed in the mounting hole.

9. The motor controller of claim 5, wherein the wire sheath is square-shaped; two sides and a bottom of the wire sheath are provided with slots, an inner wall of the mounting hole is sheathed in the slots; and the first chamber is filled with potting material which covers part of or all of the control circuit board.

10. The motor controller of claim 6, wherein the wire sheath is square-shaped; two sides and a bottom of the wire sheath are provided with slots, an inner wall of the mounting hole is sheathed in the slots; and the first chamber is filled with potting material which covers part of or all of the control circuit board.

11. The motor controller of claim 7, wherein the wire sheath is square-shaped; two sides and a bottom of the wire sheath are provided with slots, an inner wall of the mounting hole is sheathed in the slots; and the first chamber is filled with potting material which covers part of or all of the control circuit board.

12. The motor controller of claim 8, wherein the wire sheath is square-shaped; two sides and a bottom of the wire sheath are provided with slots, an inner wall of the mounting hole is sheathed in the slots; and the first chamber is filled with potting material which covers part of or all of the control circuit board.

13. A motor, comprising a motor body and a motor controller of claim 1; wherein the motor body comprises a rotary shaft, a rotor assembly, a stator assembly and a shell assembly; the rotor assembly is disposed on the rotary shaft; the stator assembly and the shell assembly are integrated and sleeved on an outer side of the rotor assembly; and the motor controller is disposed on the shell assembly.

14. The motor of claim 13, wherein the motor further comprises a box body, a circuit board, and a Hall element; the stator assembly comprises a stator core, a terminal insulator, and coil windings; the terminal insulator is disposed on one end of the stator core; the coil windings are coiled on the terminal insulator; the box body is disposed on the terminal insulator; the box body is provided with a second chamber comprising a bottom wall; the bottom wall of the second chamber is provided with a second supporting boss, and the circuit board is supported by an upper surface of the second supporting boss; the bottom wall of the second chamber is depressed to form a mounting slot; the Hall element of the circuit board is inserted into the mounting slot; and sealing glue is injected into the second chamber to seal the Hall element in the mounting slot and coat the circuit board.

15. The motor of claim 14, wherein an outer wall of the box body is provided with three mounting feet; the terminal insulator comprises a circular yoke, and a plurality of tooth portions stretching out of the circular yoke; winding slots are formed between every two tooth portions; at an inner side of one winding slot, a left support column and a right support column are disposed on an upper surface of adjacent tooth portions; at an outer side of the winding slot, a first support column is disposed on an upper surface of the circular yoke; the box body is disposed on upper surfaces of the first support column, the left support column, and the right support column via the three mounting feet.

16. The motor of claim 15, wherein the bottom wall of the second chamber is depressed to form the mounting slot, and a lug boss is formed on a bottom of the box body; a left base is disposed on a bottom of the left support column, and the upper surface of the tooth portion; a right base is disposed on a bottom of the right support column, and the upper surface of the tooth portion; a slot is formed between the left base and the right base; the lug boss is sheathed in the slot and is supported by the upper surface of the tooth portion; and the Hall element is sheathed in the mounting slot and leans outside of the rotor assembly.

17. The motor of claim 16, wherein the control chip is sheathed with a silicone case; the control circuit board is provided with a plurality of mounting feet; and the mounting feet are supported by the first plurality of supporting bosses.

18. The motor of claim 17, wherein the heat dissipation boss further comprises a second side surface; the second side surface is opposite to the first side surface; one side of the control chip is provided with a compressing bar to tightly compress the control chip on the first side surface of the heat dissipation boss; a first screw passes through the second side surface of the heat dissipation boss and is screwed up in the compressing bar to mount the compressing bar on the heat dissipation boss.

19. The motor of claim 18, wherein the second side surface of the heat dissipation boss is provided with a plurality of fins; the mounting feet are installed on the first plurality of supporting bosses via a second screw.

20. The motor of claim 19, wherein the control box is provided with a mounting hole; the control circuit board is provided with a socket; the socket is sheathed in a wire sheath; and the wire sheath is disposed in the mounting hole.

* * * * *